United States Patent [19]
Caruolo et al.

[11] 3,897,139
[45] July 29, 1975

[54] ADJUSTABLE MOUNTING APPARATUS
[75] Inventors: Antonio B. Caruolo, Vernon; Allan P. Walch, Manchester, both of Conn.
[73] Assignee: United Aircraft Corporation, East Hartford, Conn.
[22] Filed: Apr. 15, 1974
[21] Appl. No.: 461,193

[52] U.S. Cl. .................. 350/288; 350/310; 248/477
[51] Int. Cl. ............................................. G02b 5/08
[58] Field of Search ............ 350/288, 310; 248/477

[56] References Cited
UNITED STATES PATENTS
3,683,297  8/1972  Hobart et al. .................... 350/288 X
3,814,365  6/1974  Mackenzie ...................... 350/288 X Primary Examiner—Nathan Kaufman
Attorney, Agent, or Firm—Robert C. Walker

[57] ABSTRACT

An adjustable planar mounting apparatus which is free from backlash in the adjusting means and free from mounting plate distortion is disclosed. The mounting plate is oriented spatially by a fixed mounting bolt and two differential screw assemblies. The differential screw assemblies have bellows connectors which permit orientation of the differential screw shaft askew to the plane of the mounting plate and the plane of the support plate without imparting bending moments to the mounting plate.

12 Claims, 3 Drawing Figures

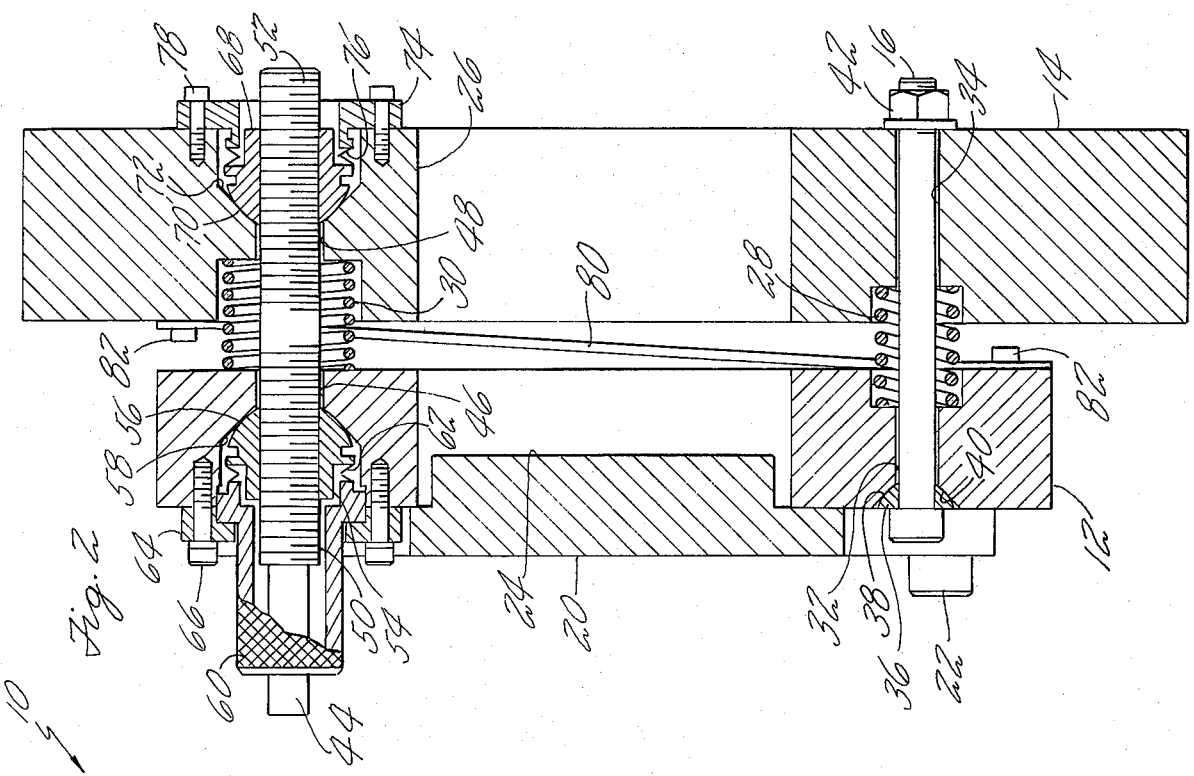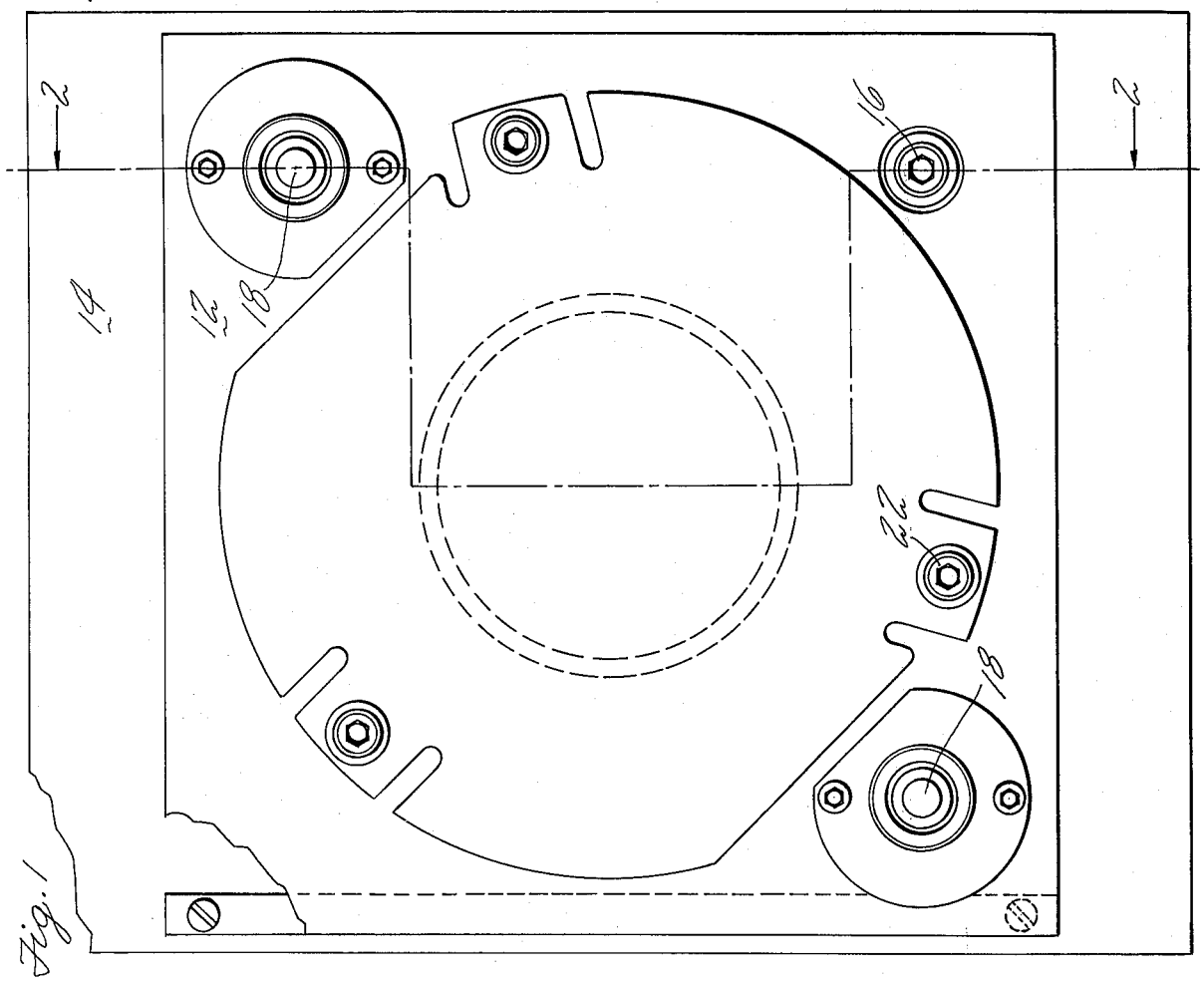

ADJUSTABLE MOUNTING APPARATUS

BACKGROUND OF THE INVENTION

1. Field of the Invention

The present invention relates to a mounting apparatus and more particularly to a spatially adjustable mounting apparatus.

2. Description of the Prior Art

Optical elements and components such as those used in present day laser systems require mounting surfaces which can be spatially adjusted. The optical surfaces are delicately prepared to eliminate surface imperfections and must be protected from subsequent distortion in order to maintain that high surface quality.

A significant source of distortion is the mounting surface itself. Bending moments induced in the mounting surface are transmitted to the optical component where they precipitate distortion. Additionally the mounting surface must be adjustable in fine increments to effect precision alignment. Backlash in the adjusting means limits the ability to adjust in fine increments.

Typical laser systems commonly comprise reflecting mirrors which direct laser radiation through a discharge medium until the beam reaches the strength required to accomplish the intended task. Adjustable mirror mounting surfaces in most systems ensure that the beam is effectively directed by the reflecting mirrors through the discharge medium. A representative system is shown in U.S. Pat. No. 3,683,297 to Hobart et al wherein a folded gas laser is described. The mirror mounting surfaces of Hobart et al are adjustable about two orthogonal axes. Rotation of one of the adjusting screws pivots the mounting surface about a line in the plane of the mounting surface passing through the centerlines of the other adjusting screw and a flexible pivot pin. The three plate mounting system of an alternate embodiment is shown in U.S. Pat. No. 3,700,313 to Karr et al. A first and second plate face one another and are hinged at one edge by a strip of spring metal. A third plate is hinged by spring metal to the second plate along a second edge 90° to the first edge. A set of coaxial adjusting screws deflect the plates relative to each other about the spring metal hinges to effect spatial alignment. In another approach to surface adjustment, a pair of adjusting means centered on orthogonal axes and a pair of coil springs provide the means for spatial adjustment. Displacement of one adjusting means rotates the mounting surface about an axis in the plane of the mounting surface passing through the centerlines of the other adjusting means and an opposing coil spring. This approach is shown in U.S. Pat. No. 3,357,268 to Richter. The above described mounting systems have generally performed successfully.

In modern lasers, such as a high power unstable resonator, the optical distance between resonating mirrors is so great that a small misalignment of the mirrors will inhibit proper operation. Furthermore, any distortion of the mirror surface by the mirror mount will cause discontinuity of the output beam pattern. In a typical resonator cavity a radiated laser beam is reflected between a concave and a convex mirror at opposing ends of a laser discharge tube. Radiation striking the concave mirror is collimated into a beam and directed toward the convex mirror. The convex mirror reforms the collimated beam into a divergent beam and redirects the beam back to the concave mirror where it is recollimated. After multiple oscillation between concave and convex mirrors, an outer ring of the collimated beam is intercepted by an annular mirror and directed out of the system. In order for the radiated beam to oscillate between the concave and convex mirrors, the axes of the mirrors must be in close alignment and the surfaces of the concave and convex mirrors must remain undistorted by the mirror mounts. Prior art mounting systems do not provide sufficient undistorted fine adjustment. Hobart et al, Tibbals, Jr. and Karr et al inventions rely in part on the deflection of a metallic member which will inherently impart undesirable bending moments to the mirror mounting surface. In addition, bending moments in the Richter and Hobart et al inventions are generated by coil springs.

An adjustable mounting means for optical instruments is disclosed in U.S. Pat. No. 2,461,190 to Wolff, Jr. In Wolff the optical mounting system is isolated from the adjusting means by a narrow neck connection to the support structure. According to Wolff the strain of bending in a bendable neck will not be transmitted to the surface carrying the optical element. A point supported mounting surface is not suitable for use where differential heating may cause distortion of the mounting surface, however. An additional deficiency of the above described design is the lack of preload on the adjusting means thereby permitting backlash within the adjusting means after the adjustment is effected.

SUMMARY OF THE INVENTION

A principal object of the present invention is to provide an undistorted mounting surface having an adjusting means which is free from backlash.

According to the present invention, a mounting plate is adjustably positioned with respect to a fixed support structure by coil springs in cooperation with a fixed mounting stud and two differential screw assemblies, the screw assemblies having the freedom to angularly relocate with respect to the plane of the mounting plate and the plane of the support structure.

A principal feature of the present invention is the flexible bellows linking the differential screw assembly to the mounting plate and to the support structure. Also, a coarse adjustment shaft is attached to the mounting plate bellows thereby providing coarse adjustment of the screw assembly; a screw shaft having differential threads at opposite ends is engaged with positioning nuts thereby providing fine adjustment of the screw assembly. Other features of the present invention are the antirotation leaf spring and the preload coil springs on the axes of the fixed mounting bolt and the differential screw assemblies.

A principal advantage of the present invention is the ability to spatially align the mounting plate surface. Another advantage of the present invention is the ability to coarse or fine adjust the mounting plate using the same differential screw assembly without applying bending moments to the mounting plate. Where the mounting apparatus is one component of a larger system, an additional advantage is the ability to remove the mounted article from the back side of the plate without disturbing the alignment of the plate.

The foregoing and other objects, features and advantages of the present invention will become more apparent in the light of the following detailed description of the preferred embodiment thereof as shown in the accompanying drawing.

BRIEF DESCRIPTION OF THE DRAWING

FIG. 1 is a simplified elevation view of a mounting plate and support structure showing the back side of a mirror attached to the mounting plate;

FIG. 2 is a simplified cross section of the mounting plate and support structure taken along the line 2—2 as shown in FIG. 1.

DESCRIPTION OF THE PREFERRED EMBODIMENT

Figure 3:
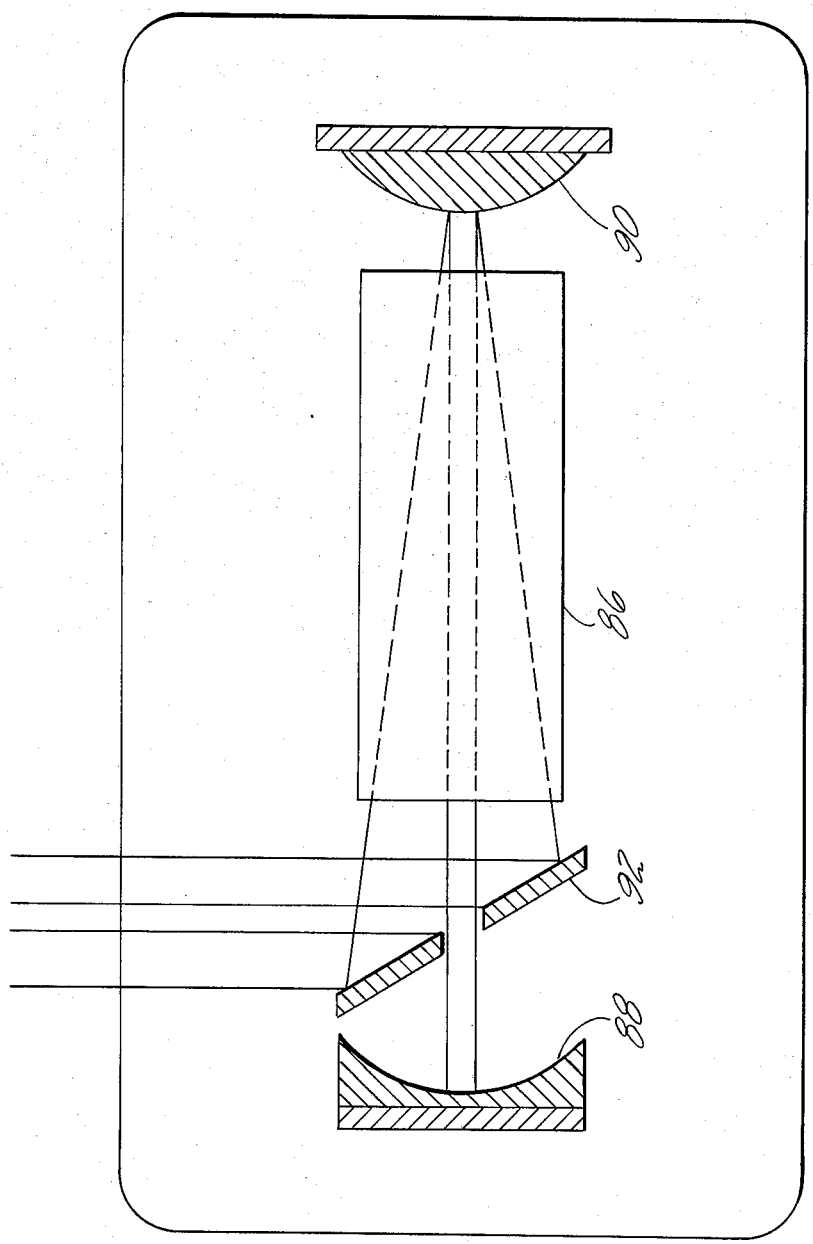
FIG. 3 is a simplified representation of a laser assembly which incorporates the present invention.

A simplified mounting plate and support structure 10 is shown in elevation in FIG. 1. A mounting plate 12 is adjustably attached to a support structure 14 by a fixed mounting bolt 16 and two differential screw assemblies 18. As shown in FIG. 2 a mirror 20 is attached to the plate by mirror screws 22, with a mirror reflecting surface 24 facing a mirror aperture 26 in the support structure. The plate and the support structure are held apart from each other by a fixed coil spring 28 and two differential coil springs 30. The mounting bolt is positioned within a first plate hole 32 in the mounting plate and a first support hole 34 in the support structure. The bolt passes through the fixed coil spring and a washer 36 having a spherical surface 38 in contact with a corresponding conical recess 40 in the mounting plate. The mounting plate and the support structure are held in fixed relationship to one another by the fixed coil spring and the mounting bolt in cooperation with a retaining nut 42.

A fine adjustment shaft 44 penetrates a second plate hole 46 in the mounting plate and second support hole 48 in the support. The fine adjustment shaft has a first screw thread 50 at the plate end and second screw thread 52 at the support structure end. The plate is secured to the fine adjustment shaft by a positioning nut 54 which has a corresponding thread pitch. The positioning nut has a spherical seat 56 which engages a corresponding conical socket 58 in the plate. The positioning nut is joined to a coarse adjustment shaft 60 by a positioning nut bellows 62. The coarse adjustment shaft is attached to the plate by a clamping flange 64 in cooperation with clamping screws 66 thereby engaging a ball and socket type connector comprising the positioning nut spherical surface and the plate socket.

The differential screw shaft assembly is attached to the support structure by a securing nut 68 which has a spherical seat 70 engaging a corresponding conical socket 72 in the support structure. The securing nut is joined to a securing flange 74 by a securing bellows 76. The securing flange is fixedly attached to the support structure by securing screws 78 thereby engaging a ball and socket type connector comprising the securing nut spherical surface and the support structure socket.

A leaf spring 80 is rigidly affixed at one end to the plate and at the other end to the support structure by attaching screws 82.

In the preferred embodiment a three point mounting system positions the mounting plate with respect to the support structure. The mounting plate is rotatable about a line connecting the centerlines of the first differential screw assembly and the fixed mounting stud and is rotatable about a second line connecting the centerlines of a second differential screw assembly and a fixed mounting stud. The lines of rotation are orthogonal.

The fixed mounting bolt in cooperation with the fixed coil spring positions the mirror mount apart from the support structure. The spherical surface on the washer contacts the corresponding conical recess in the mirror mount effectively creating a ball and socket type joint. As the plane of the mirror mount is varied in relationship to the support structure, the ball and socket joint similarly adjusts without imparting bending moments to the mirror mount. Sufficient clearance exists between the first plate hole and the mounting stud to permit angular deflection of the mounting bolt within the plate hole as the plane of the mirror mount is varied. The fixed coil spring must be sufficiently stiff to hold the fixed mounting bolt in perpendicular relationship to the support structure. In an alternate embodiment increased stiffness may be provided by attaching the support structure and mounting plate to the fixed mounting bolt by attaching nuts.

Adjustment of the first differential screw assembly rotates the plane of the mirror mount about a line through the centerlines of the fixed mounting stud and the second differential screw assembly. In a similar manner adjustment of the second differential screw assembly rotates the plane of the mirror mount about a line drawn through the fixed mounting stud and the first differential assembly.

Each differential screw assembly permits both fine adjustment and a coarse adjustment of the mounting plate. The assembly is coarse adjusted by loosening the clamping flange on the mounting plate and rotating the coarse adjustment knurled knob. The positioning nut bellows transmits torque to the positioning nut as the knurled knob is rotated. The coil spring in the differential screw assembly applies preload to the positioning nut thereby reducing backlash as coarse adjustment is effected.

The spherical surface of the positioning nut contacts the conical socket in the mirror mount thereby creating a first ball and socket type joint in the differential screw assembly. As the plane of the mirror mount is varied with respect to the plane of the support structure the positioning nut rides on the conical surface without creating residual bending moments in the mirror mount. Sufficient clearance exists between the screw shaft and the second plate hole to permit the shaft to angularly relocate with respect to the original shaft axis. The positioning nut bellows permits the positioning nut axis to remain in alignment with the adjustment shaft axis when the adjustment shaft axis is no longer perpendicular to the mirror mount plane and does so without transmitting significant bending moments to the mirror mount.

Similarly, the securing nut spherical surface contacts the support structure conical socket thereby forming a second ball and socket type joint in the differential screw assembly. The securing nut bellows allows the securing nut axis to remain in alignment with the adjustment shaft axis as the adjustment shaft axis becomes nonperpendicular with respect to the plane of the support structure. Sufficient clearance exists between the screw shaft and the support structure shaft hole to permit angular relocation of the shaft with respect to its original axis. The differential screw assembly is fine adjusted by rotating the fine adjustment shaft. As the fine adjustment shaft is rotated, the shaft moves with respect to the securing nut and the positioning nut. The positioning nut and the securing nut move with respect to one another by an amount proportional to the difference between their screw thread pitches if like handed threads and proportional to the sum of their pitches of opposite handed threads. In one embodiment the differential travel between the positioning and securing nuts and, similarly, the change in position between the mirror mount and the support structure at the differential screw assembly are described by the relationship:

$$\frac{\text{No. shaft revolutions}}{\text{40 threads per inch}} - \frac{\text{No. shaft revolutions}}{\text{41 threads per inch}} = \frac{\text{relative movement of the mirror mount and support structure.}}{}$$

The flexible bellows linking the differential screw assembly to the mirror mount and support structure permit the differential screw assembly to become nonperpendicular to the mounting plate and support structure surfaces without imparting bending moments to the mounting plate.

As the differential screw shaft assembly is adjusted, there is a tendency for the mirror mount to rotate about the fixed mounting stud. The antirotation leaf spring prevents this rotation. As a turning moment is generated between the differential screw assembly and the fixed mounting stud an equal and opposite moment is generated in the leaf spring. In this capacity the leaf spring serves the same function as the second fixed mounting stud without limiting the mirror mount to movement about a single line of rotation.

The preload coil springs are concentric with the axes of the fixed mounting bolt and the differential screw assemblies. The forces exerted by the coil springs on the mirror mount are therefore absorbed by the fixed mounting stud and the differential screw shaft without imparting bending moments to the mirror mount.

Shown in FIG. 3 is a typical laser having one mirror at each end of a laser medium and an adjustable mounting surface in accordance with the present invention to spatially align each mirror. A discharge tube 86 contains the laser medium and a concave mirror 88 and a convex mirror 90 form an unstable resonator. Each mirror is attached to a mirror mount which has been fully described. An annular coupling mirror 92 is disposed between the concave and convex mirrors. When the laser is energized, laser radiation striking the concave mirror is collimated into a beam and directed toward the convex mirror. The convex mirror reforms the collimated beam into a divergent beam and redirects the beam back to the concave mirror where it is recollimated. After a series of oscillations the beam expands and is intercepted by the annular mirror; the intercepted radiation is coupled out of the resonator.

In a typical embodiment of the laser shown in FIG. 3 the distance between the concave and convex mirrors is 32 feet, the diameter of the center hole in the annular coupling mirror is 1 inch, the radius of curvature of the concave mirror is 102 feet and the radius of curvature of the convex mirror is 37 feet. If the mirrors are misaligned by as little as four thousandths of a degree, the laser operation will deviate unacceptably from the design operation condition. In the preferred embodiment of the invention a full rotation of the fine adjustment shaft will deflect the mirror axis less than seven thousandths of a degree.

In many installations it may be desirable to remove a mounted component from the mounting and support assembly with a minimum of disassembly of non-related parts. In the embodiment shown the concave and convex mirrors can be detached from their mounting surfaces without removing or disturbing the discharge tube, coupling mirror, or end mirror mounting surfaces thereby preserving initial alignment.

Although the present invention has been shown as a mounting surface for laser mirrors, the invention may be utilized wherever planar mounting is required. For example, the mounting system may be utilized as a base for a telescope, a transmitting mirror or antenna, or any similar precision application.

Although the invention has been shown and described with respect to preferred embodiments thereof, it should be understood by those skilled in the art that the foregoing and other changes in the form and detail thereof can be made without departing from the spirit and the scope of the present invention.

We claim:

1. Apparatus for adjusting a planar mounting surface, comprising:
    a support structure having a conical socket;
    a mounting plate positioned adjacent to the support structure and having a conical socket;
    a fixed connecting means joining the mounting plate to the support structure including means for spacing apart the mounting plate from the support structure;
    a first adjustable connecting means joining the mounting plate to the support structure comprising,
        a screw shaft penetrating both the support structure and the mounting plate and having a first screw thread at one end of the shaft and a second screw thread at the other end of the shaft,
        a first nut engaging the first screw thread, the first nut having a spherical surface which cooperates with the conical socket in the support structure,
        a second nut engaging the second screw thread, the second nut having a spherical surface which cooperates with the conical socket in the mounting plate,
        a first bellows attached to the first nut, the first bellows being fixedly positioned with respect to the support structure,
        a second bellows attached to the second nut, the second bellows being rotatably positioned with respect to the mounting plate,
        a spring member concentric with the screw shaft and located between the support structure and the mounting plate, the spring member being in compressed state thereby applying a preload to the first and second nuts.

2. The invention according to claim one further including a detachable locking member affixed to the mounting plate, the locking member engaging the second bellows to prevent rotation of the bellows with respect to the mounting plate.

3. The invention according to claim two wherein the fixed connecting means is joined to the mounting plate by a ball and socket type connector.

4. The invention according to claim three wherein the fixed connecting means comprises a bolt and an adjusting nut for varying the distance between the mounting plate and the support structure.

5. The invention according to claim four wherein the means for spacing apart the mounting plate from the support structure is a coil spring.

6. The invention according to claim one including further:
a leaf spring fixedly attached at one end to the support structure and at the other end to the opposing surface of the mounting plate to prevent rotation of the mounting plate about the fixed connecting means.

7. The invention according to claim one wherein said first screw thread has 40 threads per inch and wherein said second screw thread has 41 threads per inch.

8. The invention according to claim one wherein said first and second screw threads are both right hand threads or both left hand threads.

9. The invention according to claim one including further a second adjustable connecting means for joining the mounting plate to the support structure and comprising,
a screw shaft penetrating both the support structure and the mounting plate and having a first screw thread at one end of the shaft and a second screw thread at the other end of the shaft,
a first nut engaging the first screw thread, the first nut having a spherical surface which cooperates with the support plate conical socket,
a second nut engaging the second screw thread, the second nut having a spherical surface which cooperates with the mounting plate conical socket,
a first bellows attached to the first nut, the first bellows being fixedly positioned with respect to the support,
a second bellows attached to the second nut, the second bellows being rotatably positioned with respect to the mounting plate,
a spring member concentric with the screw shaft and located between the support structure and the mounting plate, the spring member being in a compressed state thereby applying a preload to the first and second nuts.

10. The invention according to claim nine wherein the first and second adjustable connecting means are located on separate axes which are in the plane of the mounting plate, are orthogonal and intersect with each other at the center of the fixed connecting means.

11. The invention according to claim ten further including:
locking means affixed to the mounting plate and engaging each second bellows thereby preventing rotation of the bellows with respect to the mounting plate; and
a leaf spring fixedly attached at one end to the support structure and at the other end to the opposing surface of the mounting plate to prevent rotation of the mounting plate about the fixed connecting means.

12. The invention according to claim eleven wherein said first and second screw threads are both right hand threads or both left hand threads and wherein said first screw thread has 40 threads per inch and said second screw thread has 41 threads per inch.

* * * * *

UNITED STATES PATENT OFFICE
CERTIFICATE OF CORRECTION

PATENT NO. : 3,897,139
DATED : July 29, 1975
INVENTOR(S) : Antonio B. Caruolo and Allan P. Walch It is certified that error appears in the above-identified patent and that said Letters Patent are hereby corrected as shown below:

Column 5, line 12: delete underscoring between "relative movement" and "of the mirror".

Signed and Sealed this fourth Day of November 1975

[SEAL]

Attest:

RUTH C. MASON
*Attesting Officer*

C. MARSHALL DANN
*Commissioner of Patents and Trademarks*